United States Patent [19]

Zauner et al.

[11] 4,446,960

[45] May 8, 1984

[54] TUBING LOADER

[75] Inventors: Otto Zauner, Vineland; Fred Bender, Millville, both of N.J.

[73] Assignee: Owens-Illinois, Inc., Toledo, Ohio

[21] Appl. No.: 281,815

[22] Filed: Jul. 9, 1981

[51] Int. Cl.³ ............................................. B65G 47/24
[52] U.S. Cl. ...................................... 198/408; 414/24; 414/745
[58] Field of Search ............... 198/408, 801, 817, 831, 198/836, 607, 622; 414/24, 22, 745, 910, 104; 53/148, 444

[56] References Cited

U.S. PATENT DOCUMENTS

| | | | |
|---|---|---|---|
| 3,323,633 | 6/1967 | Engel et al. | 198/622 |
| 3,426,884 | 2/1969 | Donner | 198/408 |
| 4,132,012 | 1/1979 | Saloom | 198/817 |

FOREIGN PATENT DOCUMENTS 54-151271  11/1979  Japan .................................. 414/745

*Primary Examiner*—Robert J. Spar
*Assistant Examiner*—Jonathan D. Holmes
*Attorney, Agent, or Firm*—J. R. Nelson; M. E. Click

[57] ABSTRACT

A device for manipulating and orienting elongate tubular stock receives such stock in a horizontal position, separates and individually spaces such stock, reorients it vertically and transfers it to associated equipment. Elongate stock is manually loaded onto a horizontal bed from packing containers or other supply means unrelated to the invention. Guide wheels separate and horizontally juxtapose the stock in a single-file horizontal row. A chain conveyor then individually engages each piece of stock, and lifts and rotates it generally about one end into a vertical position. The stock is then transferred horizontally as necessary, to associated equipment. The elongate stock may be cylindrical such as glass tubes or rods or define various cross-sections such as triangular, square or polygonal.

22 Claims, 10 Drawing Figures

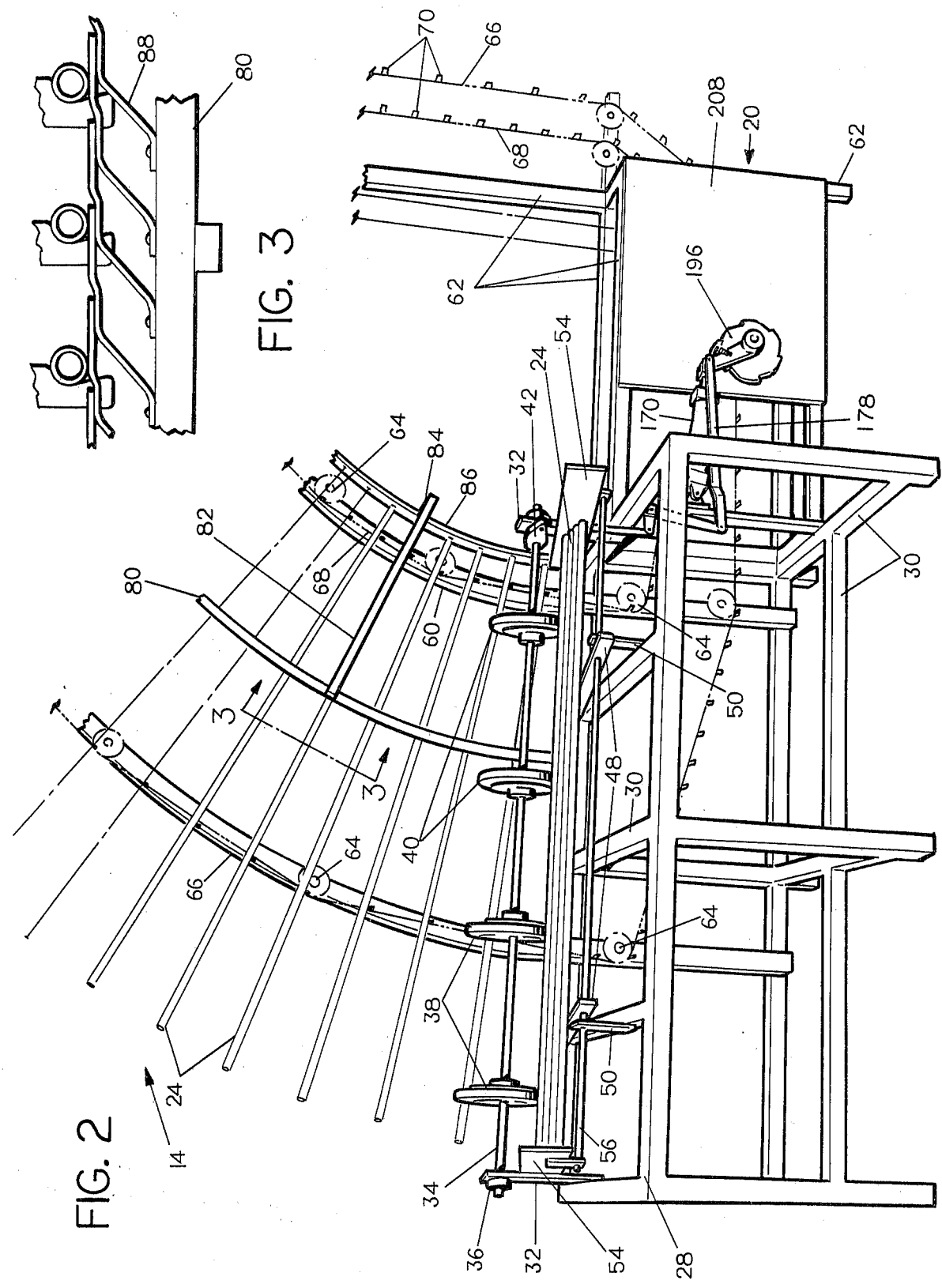

FIG. 8

TUBING LOADER

BACKGROUND OF THE INVENTION

The invention relates generally to material handling equipment and more specifically to a material handling conveyor for separating, reorienting and transferring material such as rods, tubes, and the like. In innumerable industrial applications, various automatic and semi-automatic machines have all but replaced manual labor in high volume, repetitive production tasks. While many such machines, characterized typically by injection molding machines, require bulk material which can be easily loaded, numerous other classes of machines utilize material in preforms. For example, machines for high volume production of glass vials and ampoules utilize hollow cylindrical glass stock and effect the formation of the articles by application of heat, axial tension and radial compression. Due to certain well appreciated characteristics of glass, practical handling considerations dictate a maximum length to the glass tubes which may be utilized by such vial and ampoule fabricating machines. Typically, these machines will utilize approximately a 5 foot length of glass from which a plurality of vials or ampoules are formed.

The manufacture of vials and ampoules from such a preform necessitates the repeated loading of the production machine with a length of glass tubing. This repeated reloading of the vial machine is a significant obstacle to maximum production of an otherwise fully automatic machine. For example, the loading operation clearly requires the presence of an operator. The operator's presence is, however, only required a small portion of time in order to reload the empty fabrication stations. This, of course, suggests that one operator can man several machines. However, reloading requirements are best described as being random and should two fabrication stations on two separate machines require simultaneous attention, it is clear that, with only a single operator, one machine will go momentarily unattended resulting in an empty fabrication station and a loss of a fabricated article. Such an empty station not only reduces production, but also ultimately increases its cost and the cost of the articles as well.

The prior art offers solutions to this problem. One approach has been to include indexable turrets at each fabrication station which rotate upon demand to provide a fresh length of glass tubing. Typically, such turrets will receive and dispense up to five lengths of glass tubing, thus significantly increasing the interval during which the machine may function unattended and improve its productivity since the likelihood that the machine will operate with one or more empty fabrication stations is substantially reduced. It should be apparent, however, that such a sophisticated turret arrangement not only depends upon the presence but also the skill of an operator. In fact, the skill necessary to load a machine having turrets is much greater than that required to load a machine which is not so equipped due to the close proximity of the receiving means in the turrets. Secondly, a machine equipped with turrets will necessarily be more complex than a machine lacking them, inasmuch as each individual fabrication station must include the turrets, sensing means to determine the exhaustion of a length of tubing and means to index the turret and supply a new length of tubing.

SUMMARY OF THE INVENTION

The instant invention addresses these problems and comprehends a mechanism whereby glass tubing or other similar elongate stock is received on a horizontal bed or table, separated and spaced into a single-file row, reoriented into a vertical position and transported to a work station. The receiving bed comprises an inclined surface or plurality of supports which guide the tubular stock to multiple wheels having a diameter large in comparison to the stock and which have their peripheries spaced above the surface of the inclined bed or support approximately the diameter of the stock. These wheels or rollers order and juxtapose the stock into a one-unit-thick layer. The stock is then received by a chain type conveyor which defines a quadrant of a circle. As the stock and chain conveyor traverse the quadrant, the stock is reoriented from a horizontal to a vertical position. The stock is then transferred to a conveyor which transports the stock horizontally to associated equipment. This equipment may be pivoting, reciprocating or indexing delivery apparatus which dispenses the stock into associated tooling or handling equipment on demand.

It is thus the object of the instant invention to provide a mechanism which receives elongate stock and transfers it, upon demand, to a machine or mechanism utilizing such stock.

It is a further object of the instant invention to provide a mechanism which receives elongate stock in a horizontal orientation and reorients it into a vertical orientation.

It is a still further object of the instant invention to provide a mechanism which separates and uniformly juxtaposes elongate stock such that the supply of such stock is related to travel of the orienting and transporting mechanism.

It is a still further object of the instant invention to provide an elongate stock transporting mechanism which is substantially automatic in operation and which requires minimal operator attention.

Additional objects and advantages of the instant invention will become apparent by reference to the following specification and attached drawings.

BRIEF DESCRIPTION OF THE DRAWINGS

FIG. 2 is an enlarged perspective view of the stock receiving table of a tubing loader according to the instant invention;

FIG. 3 is a fragmentary view of a stock retention assembly taken along the line 3—3 of FIG. 2;

FIG. 8 is an enlarged perspective view of the horizontal conveyor portion of a tubing loader according to the instant invention;

DESCRIPTION OF THE PREFERRED EMBODIMENT

Figure 1:
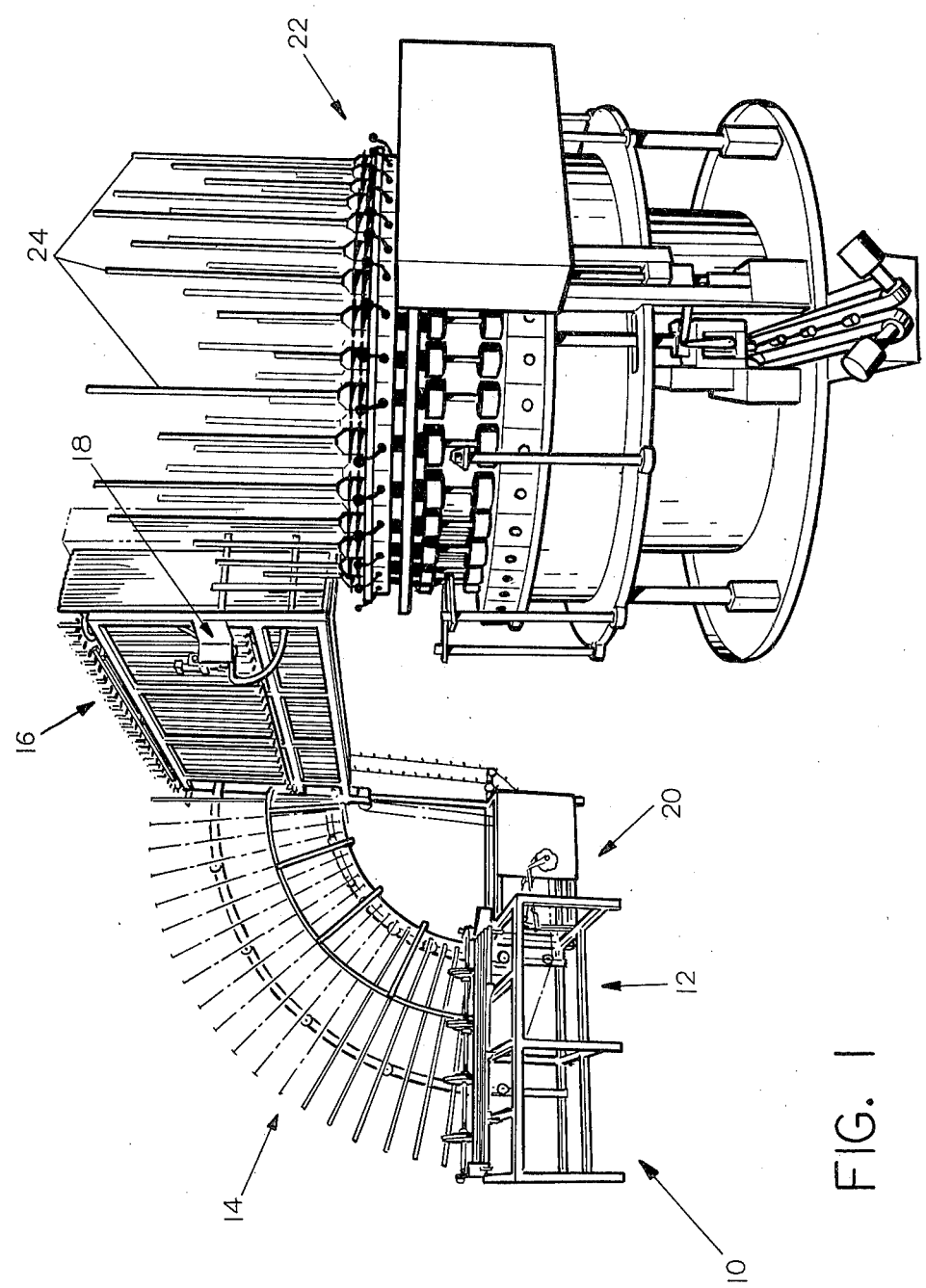
FIG. 1 is a perspective view of a tubing loader according to the instant invention.

Referring to FIG. 1, a tubing loader according to the instant invention is generally designated by the reference numeral 10. The tubing loader 10 generally comprises five assemblies, namely, a stock feed table assembly 12, a reorienting or erecting conveyor assembly 14, a horizontal or cross-conveyor assembly 16, a tubing transfer assembly 18, and a cyclic drive assembly 20. The tubing loader 10 may be utilized with various production machines such as a glass vial machine 22 which receives lengths of stock such as glass tubes 24 and fabricates glass vials, ampoules or other similar containers therefrom. At the outset, it should be understood that the specific stock, namely the glass tubes 24, as well as the associated vial machine 22 is included for purposes of description and example only. Therefore, it should be appreciated that the tubing loader 10 is equally suited for use with elongate stock of various cross-sections and compositions which is utilized in diverse machines.

Referring now to FIG. 2, the stock feed table assembly 12 defines a generally rectangular frame 28 having suitable vertical and horizontal cross braces 30 which provide appropriate structural rigidity to the frame 28. At opposite ends of the rectangular frame 28 are disposed a pair of rigid vertical uprights 32. The uprights 32 support and position a horizontally extending shaft 34 which is rotatably mounted within suitable bearings 36 secured to the uprights 32. Secured to the shaft 34 at substantially equal intervals along its length are a plurality of separator wheels 38. The wheels 38 include a circumferential annulus 40 which may be fabricated of a suitable elastomeric material such as rubber. A bell crank 42 is rigidly secured to the shaft 34. The bell crank 42 is reciprocably driven by means to be described subsequently and, thus, imparts oscillating rotating motion to the shaft 34 and associated rollers 38.

Figure 7:
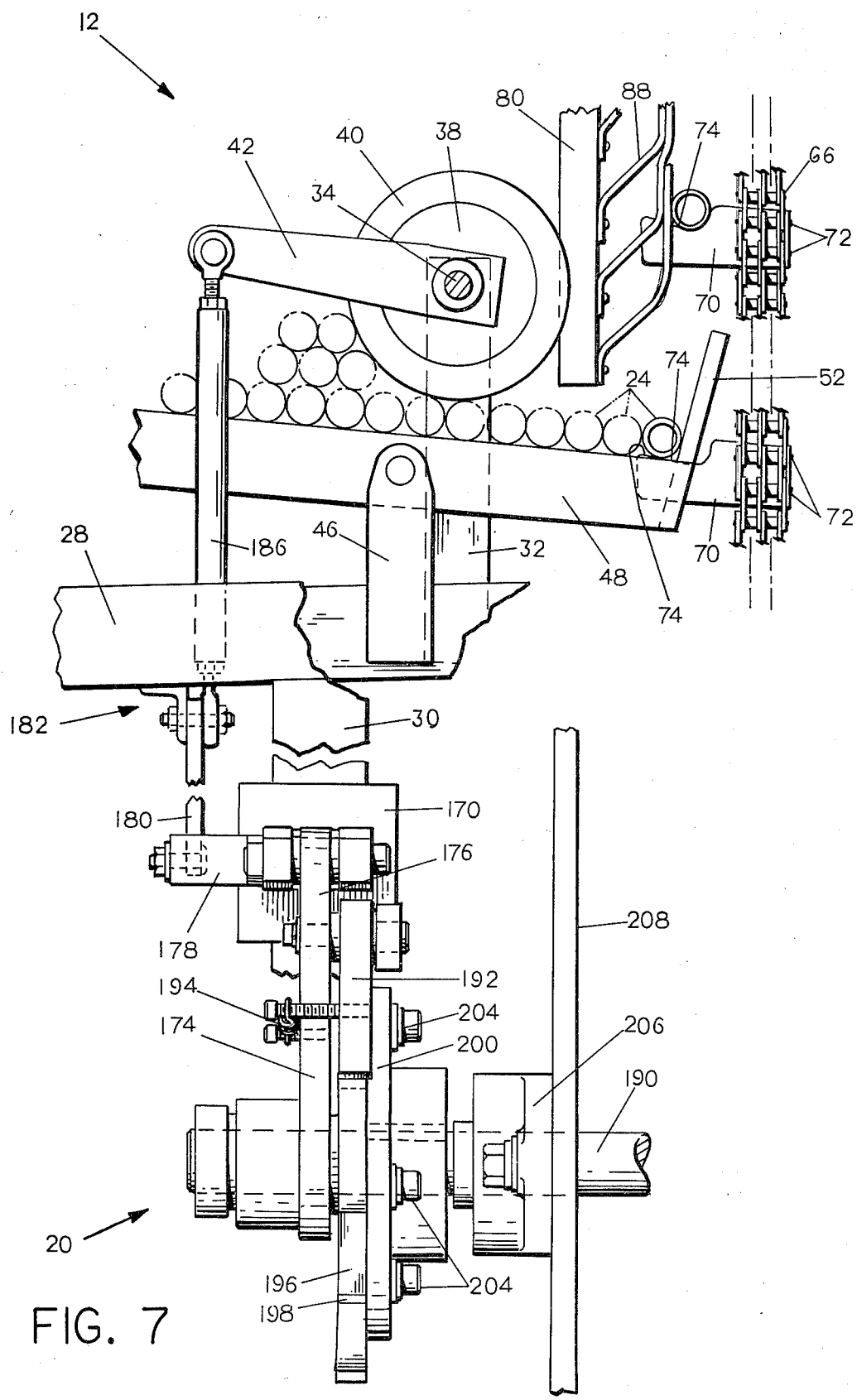
FIG. 7 is a fragmentary side elevational view of the cyclic drive means and tube separation means of the tubing loader according to the instant invention.

Referring now to FIGS. 2 and 7, vertically extending brackets 46 secured to the rectangular frame 28 support and secure one end of each of a pair of inclined stock receiving bars 48. The opposite ends of the stock receiving bars 48 are supported and secured by a similar pair of vertically oriented braces 50. The lower ends of the stock receiving bars 48 are each secured to a like pair of obliquely disposed stop plates 52. The angle of incline of the stock receiving bars 48 is not critical but must be at least sufficient to cause the stock placed thereupon to roll toward the stop plates 52 but should not be so great as to cause jamming forces directed toward the rollers of sufficient magnitude to render separation of the tubes 22 difficult, or of sufficient magnitude as to force the tubes 24 up the inclined wall of the stop plates 52.

The stock feed table assembly 12 also includes a pair of vertically oriented guides 54 which are secured at one end to the uprights 32 and at the other to a horizontally extending brace 56 which interconnects the stock receiving bars 48 and the braces 50. The inside faces of the guides 54 are adjusted to be separated by a distance just slightly greater than the length of the stock such as the glass tubes 24 to be placed upon the stock receiving arms 48. The guides 54 laterally position the glass tubes 24 or other stock for presentation to the reorienting or erection conveyor assembly 14.

Figure 4:
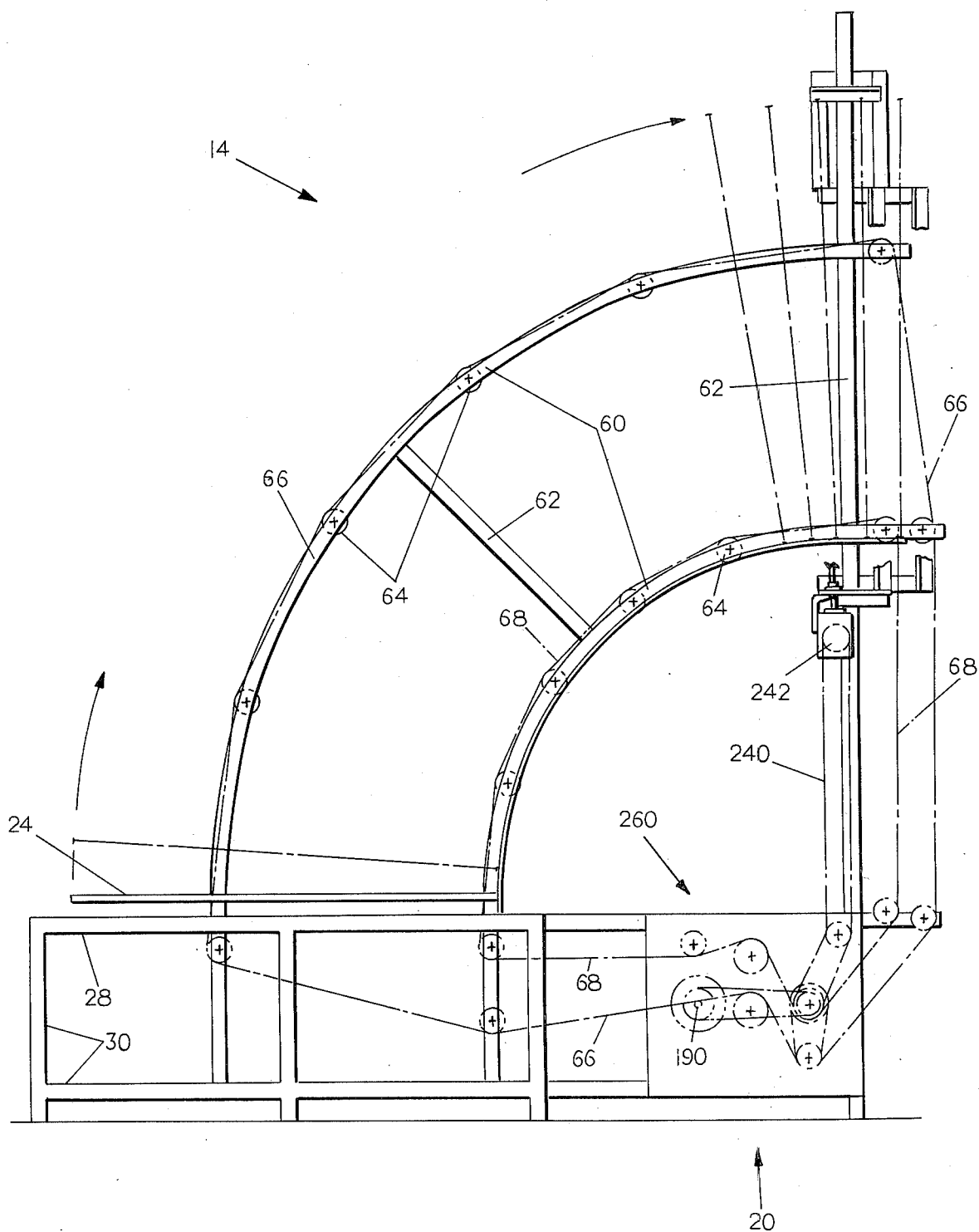
FIG. 4 is a diagrammatic elevational view of the drive chain arrangement of a tubing loader according to the instant invention.

Referring now to FIGS. 2 and 4, the reorienting or erection conveyor assembly 14 is seen to include a pair of spaced apart arcuate supports 60 which each extend over a quadrant of a circle. Preferably, vertical and oblique frame structures 62 provide appropriate bracing for the arcuate supports 60. Upon each of the supports 60 are rotatably mounted a plurality of idler sprockets 64. The idler sprockets 64 provide guide and reduced friction support means for a pair of conveyor chains, an outer conveyor chain 66, and an inner conveyor chain 68. The outer chain 66 and the inner chain 68 independently and synchronously circulate about a plurality of sprockets and a tensioning wheel which forms a portion of the cyclic drive assembly 20 which will be subsequently described.

Referring now briefly to FIG. 7, each of the conveyor chains 66 and 68 include a plurality of tube transporting lugs 70. The lugs 70 are secured to the side of the conveyor chains 66 and 68 opposite the sprockets 64 by suitable fasteners 72. Each of the lugs 70 include a lip or ledge portion 74 which declines downwardly and rearwardly as viewed in FIG. 7 at a small acute angle.

Figure 8:
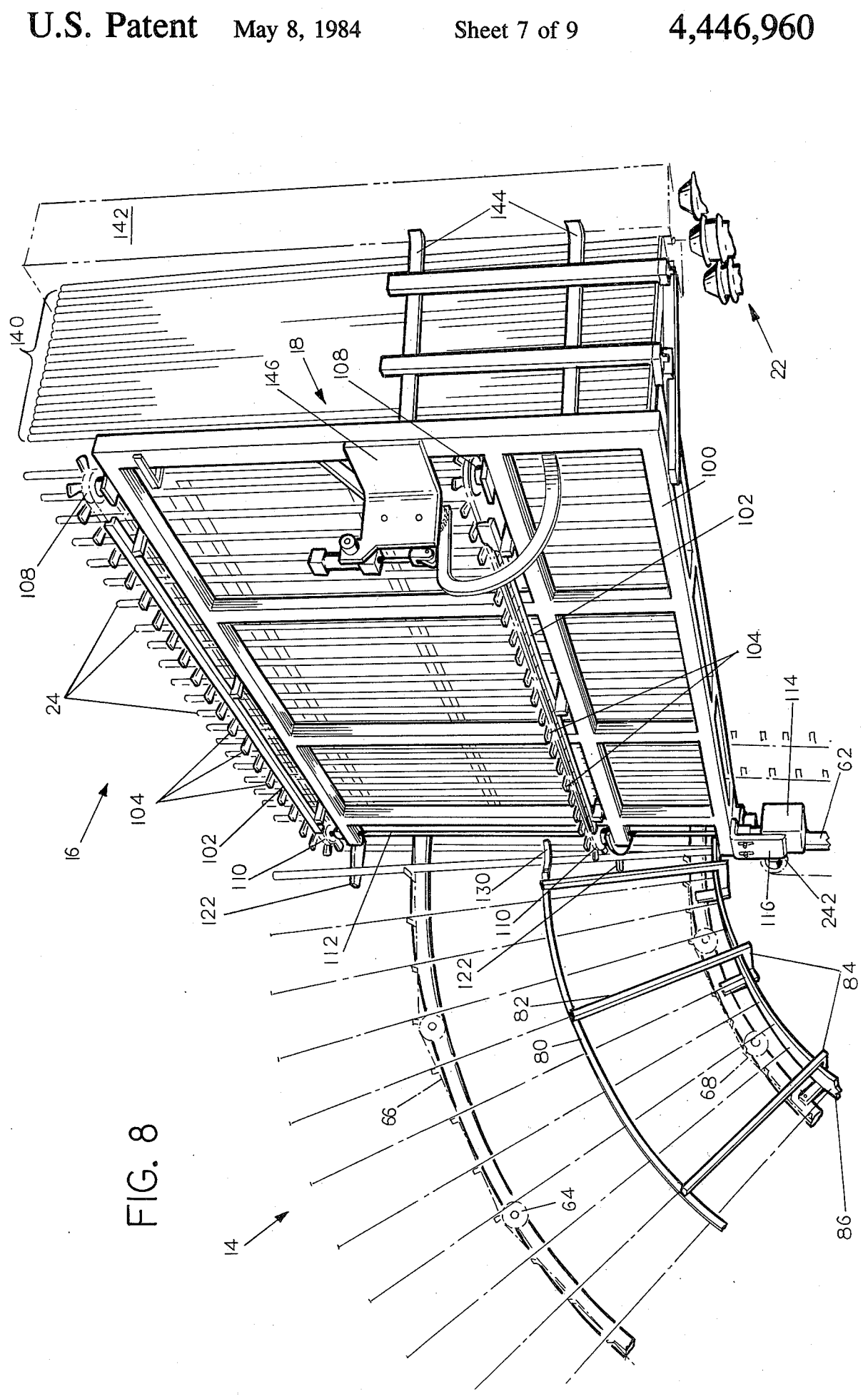

Referring now to FIGS. 2 and 3, the reorienting and erection conveyor assembly 14 also includes a tube retention assembly which comprises an arcuate beam 80 which is positioned forward of the arcuate supports 60 and generally equidistant therefrom. The beam 80 is supported by a plurality of radially disposed arms 82 which are also illustrated in FIG. 8. The arms 82 include a rearwardly extending portion 84 which is connected to the adjacent arcuate support 60. To this rearwardly extending portion 84 of the arm 82 is secured a guide plate 86 which extends from the guide 54 adjacent the bell crank 42 of the stock feed table assembly 12 in an arc to the lower portion of the horizontal or cross-conveyor assembly 16. The guide plate 86 provides a smooth surface against which the ends of the tubes 24 slide as they are reoriented from a horizontal to a vertical position. The arcuate beam 80 provides mounting for a plurality of overlapping, generally Z-shaped leaf spring members 88 which extend from the stock feed table assembly 12 (see FIG. 7) to the horizontal or cross-conveyor assembly 16 (see FIG. 8). As illustrated in FIG. 7, the leaf spring members 88 provide spring force directed toward the chains 66 and 68, and specifically toward the lugs 70 mounted thereupon and springingly retain the tubes 24 therein.

Figure 9:
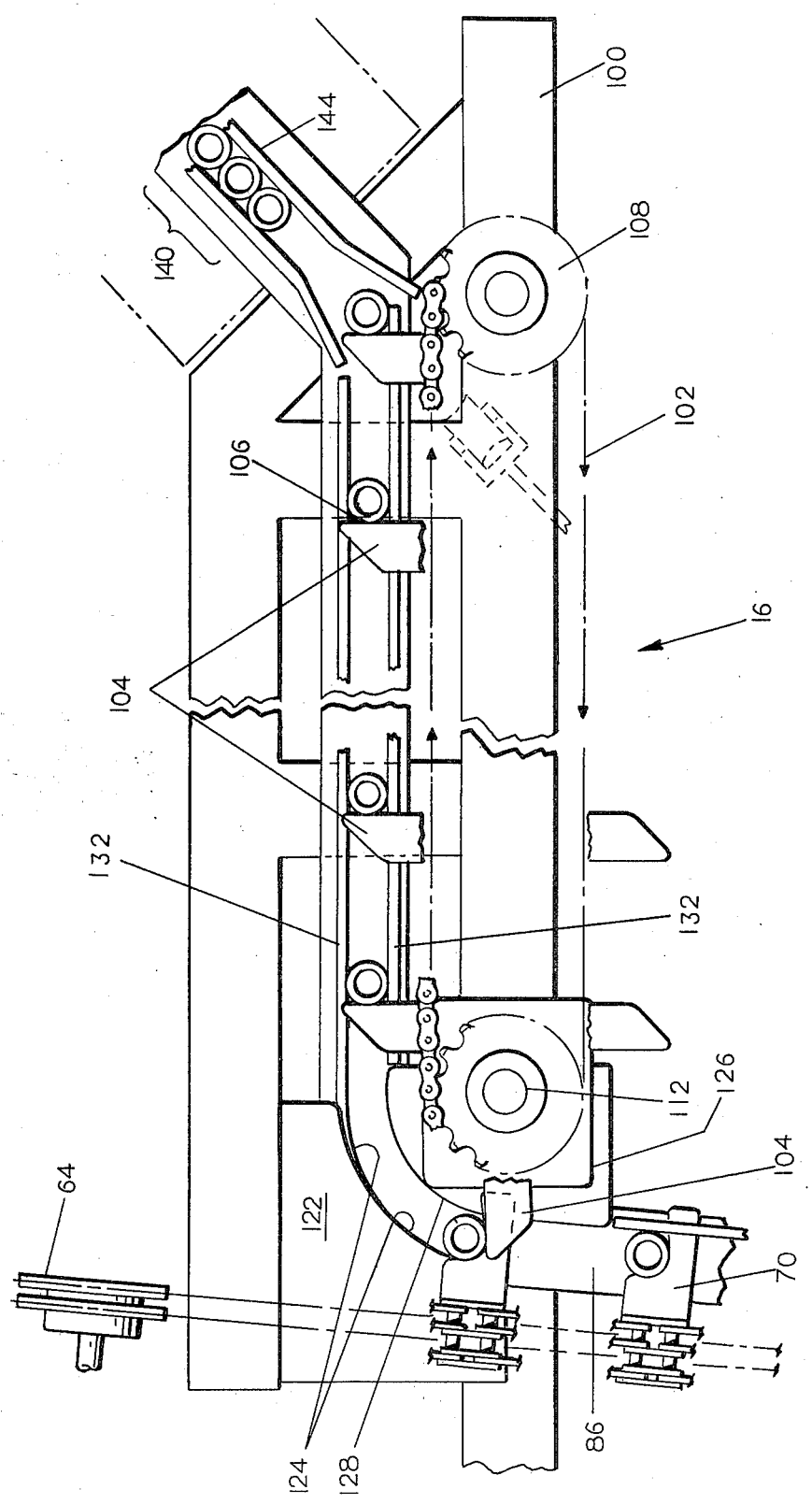
FIG. 9 is a fragmentary top plan view of the horizontal conveyor portion of a tubing loader according to the instant invention.

Referring now to FIGS. 8 and 9, the reorienting or erection conveyor assembly 14 delivers the elongate stock such as the glass tubes 24 to the horizontal or cross-conveyor assembly 16. The conveyor assembly 16 includes a vertically disposed rectangular frame 100 which is supported by the frame structure 62. Disposed in vertical alignment on the frame 100 is a pair of upper and lower chain conveyors 102. Each of the conveyor chains 102 includes a like plurality of outwardly extending lugs 104. The lugs 104 are secured to the chains 102 by suitable means and are generally similar to the lugs 70 disposed on the outer and inner chains 66 and 68, respectively, except that the stock engaging faces 106 may be flat inasmuch as it is substantially unnecessary for the lugs 104 to cradle the stock along its horizontal traverse. At one end of the frame 100, the conveyor chains 102 are supported by idler sprockets 108. At the opposite end, the conveyor chains 102 are disposed about drive sprockets 110. The drive sprockets 110 are fixedly secured to a vertically oriented drive shaft 112 which extends below the lower portion of the frame 100. The drive shaft 112 is operably connected the right angle drive assembly 114. An input shaft 116 of the right angle drive assembly 114 receives rotary energy from the cyclic drive assembly 20 as will be subsequently described. Rotation of the drive shaft 112 thus drives the conveyor chain 102 in circulating linear fashion and translates the elongate stock such as a glass tube 24 engaged by the faces 106 of the lugs 104 from the reorienting or erection conveyor assembly 14 to the tubing transfer assembly 18.

The horizontal or cross-conveyor assembly 16 also includes a horizontally extending guide plate 120 which supports the elongate stock as it is translated horizontally by the lugs 104 of the conveyor chains 102. Transfer of the glass tubes 24 from the reorienting or erection conveyor assembly 14 to the horizontal or cross-conveyor assembly 16 is facilitated by a pair of plates 122 which are secured to the frame 100. The plates 122 includes a concavely curved surface 124 which is tangent to one side of the glass tubes 24 as they exit the erection conveyor assembly 14 and is likewise tangent to the same wall of the glass tubes 24 as they enter the linear portion of the cross-conveyor assembly 16. Similar pairs of plates 126 having convexly curved surfaces 128 are tangent to the opposite side of the glass tubes 24 as they exit the erection conveyor assembly 14 and are likewise tangent to the same opposite sides of the glass tubes 24 as they enter the linear portion of the cross-conveyor assembly 16. Transfer of the glass tubes 24 is further assisted by a curved terminal portion 130 of the last spring member 88 which extends generally into the transfer zone between the erection conveyor assembly 14 and the cross-conveyor assembly 16. Suitable spaced apart parallel horizontal guide rails 132 maintain the glass tubes 24 or the stock in proper orientation as they translate along the cross-conveyor assembly 16. It should be noted that transfer of the stock such as the glass tubes 24 from the erection conveyor assembly 14 to the cross-conveyor assembly 16 is enhanced by two considerations. First of all, the linear speeds of the conveyor assemblies 14 and 16 at the point of transfer are preferably substantially equal. Secondly, the phase relationship between the lugs 70 of the erection conveyor assembly 14 and the lugs 104 of the cross-conveyor assembly 16 are preferably in phase at the point of transfer as illustrated in FIG. 8. Such operation has been found to minimize shock and concomitant damage to the glass tubes 24 and to minimize malfunction at the point of transfer.

Figure 10:
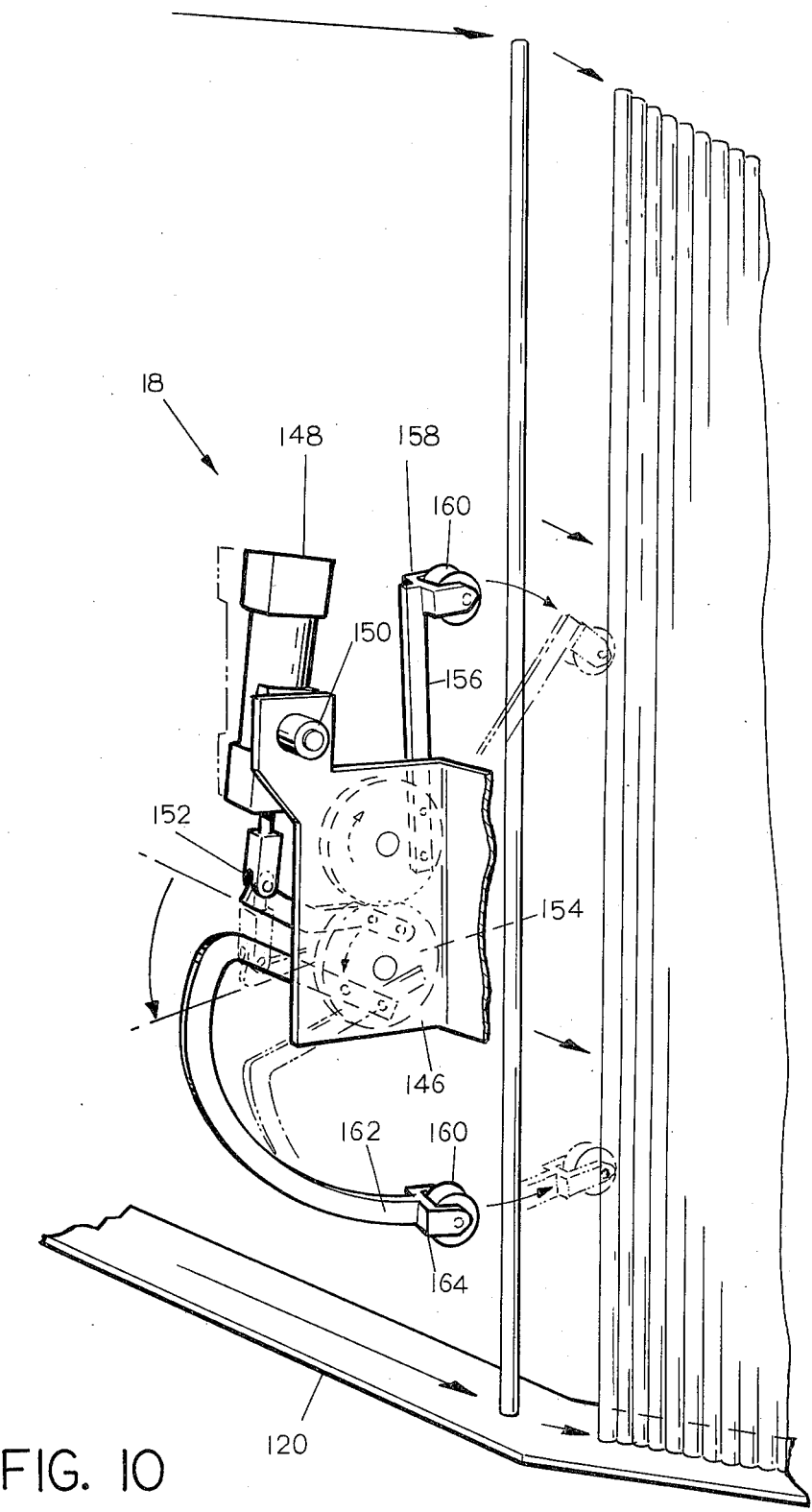
FIG. 10 is a perspective view of the tubing transfer assembly of a tubing loader according to the instant invention.

Referring now to FIGS. 8, 9 and 10, the tubing transfer assembly 18 transfers the glass tubes 24 or other stock from the horizontal cross-conveyor assembly 16 and loads a storage area 140 from whence the glass tubes 24 may be removed as needed by appropriate machine loading equipment 142 which is shown in dashed lines and forms no portion of the instant invention. The storage area 140 is defined by suitable horizontally extending rails 144 which maintain the glass tubes 24 or other stock in ordered vertically oriented juxtaposition. The horizontal guide plate 120 extends into the storage area 140 to provide support for the glass tubes 24. The tubing transfer assembly 18 includes a mounting plate 146 secured to the frame 100 of the horizontal or cross-conveyor assembly 16. A double acting pneumatic cylinder 148 is pivotally disposed relative to the mounting plate 146 by suitable pivot means 150. Reciprocating linear output motion of the pneumatic cylinder 148 is transformed to cyclic rotary motion through a clevis and arm linkage 152 which is secured to one of a pair of engaging spur gears 154. Secured to the upper spur gear 154 is a straight transfer arm 156 having a clevis 158 secured to the terminus thereof. The clevis 158 provides appropriate mounting for a roller 160 having a face suitably contoured to engage the curved outside wall of the stock such as the glass tubes 24. The lower one of the spur gears 154 is generally similarly equipped, having a generally U-shaped arm 162 which terminates in a clevis 164 within which a second roller 160 is rotatably disposed. Transfer of the stock such as the glass tubes 24 is achieved when one of the tubes 24 attains the position illustrated to the right in FIG. 9, i.e., in the throat of the horizontal rails 144. At this time, the pneumatic cylinder 148 is activated and the gears 154 move the transfer arms 156 and 162 from their positions illustrated in solid lines to the positions illustrated in dashed lines, transferring the glass tubes 24 from the lugs 104 on the conveyor chains 102 into the storage area 140. The pneumatic cylinder 148 is then activated in a reverse manner to retract the transfer arms 156 and 162 to the positions illustrated in solid lines.

Figure 5:
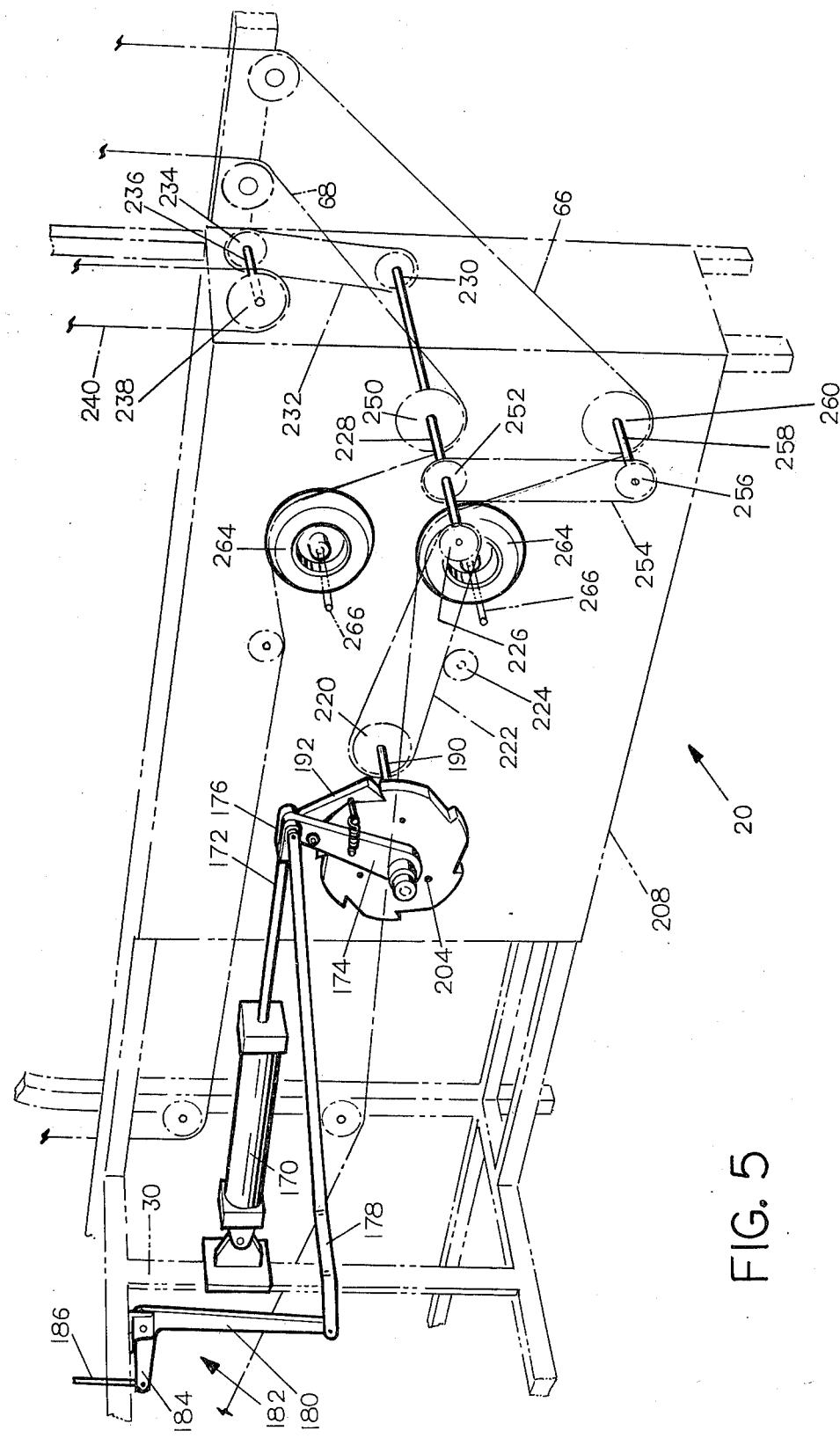
FIG. 5 is an enlarged perspective view of the chain drive mechanism according to the instant invention.
Figure 6:
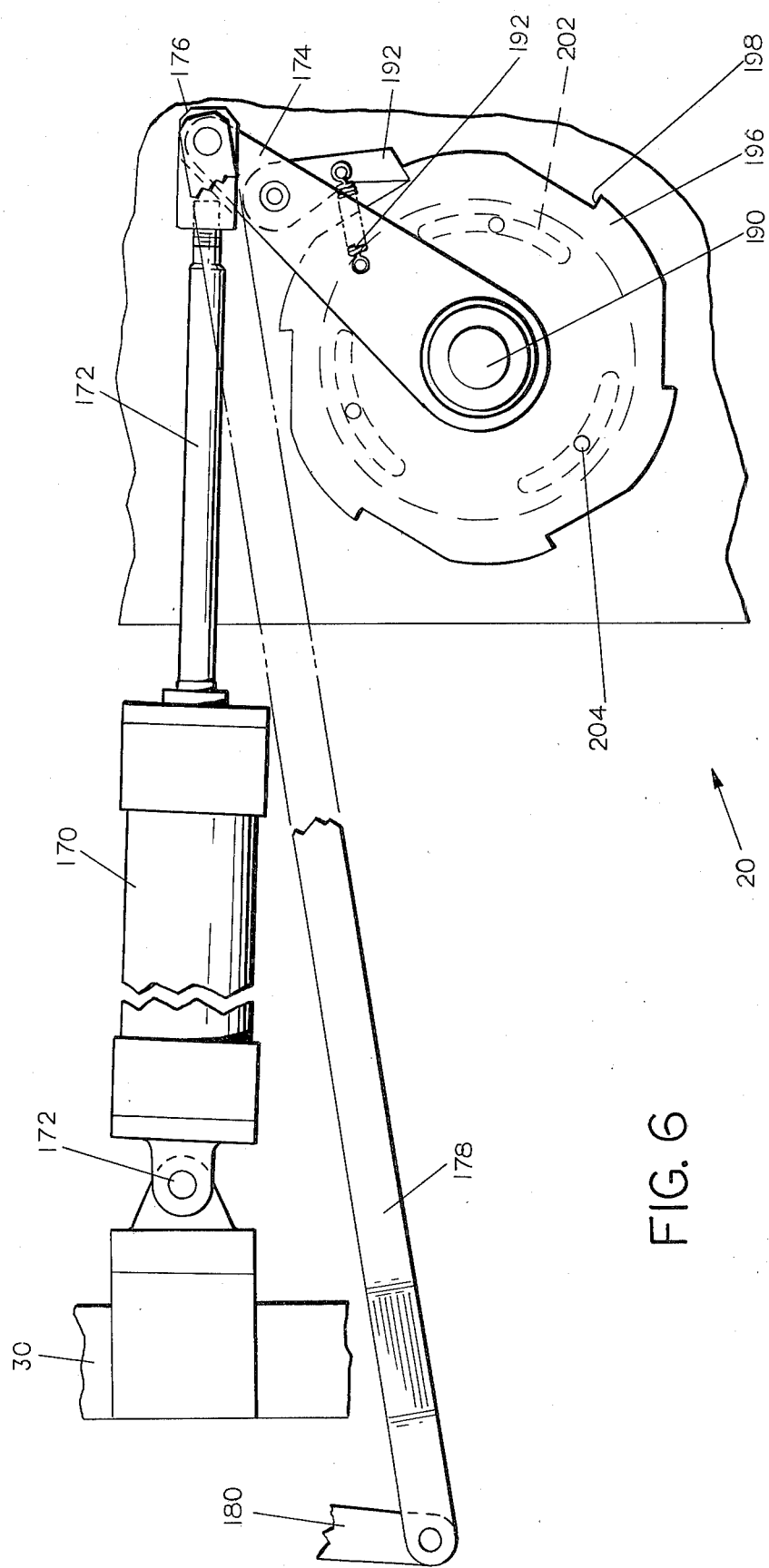
FIG. 6 is a fragmentary, elevational view of the cyclic drive means of a tubing loader according to the instant invention.

Referring now to FIGS. 5, 6 and 7, the cyclic drive assembly 20 includes a pivotally mounted double-acting pneumatic cylinder 170. The cylinder 170 is secured by suitable means to the braces 30 of the stock feed table assembly 12. A reciprocating piston rod 172 extends from the double-acting pneumatic cylinder 170 and is connected to a ratchet arm 174 by a clevis and pivot pin assembly 176. Also secured to the clevis and pivot pin assembly 176 is one end of a reciprocating arm 178. The opposite end of the reciprocating arm 178 is pivotally connected to one arm 180 of a bell crank assembly 182. The other arm 184 of the bell crank assembly 182 is disposed at approximately 90° to the arm 180 and is pivotally connected to one end of an adjustable link 186. The opposite end of the adjustable link 186 is pivotally connected to the bell crank 42 secured to the shaft 34. Actuation of the double-acting pneumatic cylinder 170 and reciprocation of the piston rod 172 and reciprocating arm 178 thus produces limited angular rotation of the rollers 38 disposed upon the shaft 34 of the stock feed table assembly 12.

The ratchet arm 174 is disposed for free rotation about the axis of a shaft 190. A pawl 192 is pivotally secured to the ratchet arm 174 and biased toward the shaft 190 by a suitable tension spring 194. Also positioned about the shaft 190 is a ratchet wheel 196 having a plurality of ratchet teeth 198 which may be engaged by the pawl 192 upon clockwise rotation of the pawl 192 relative to the shaft 190. Disposed immediately adjacent and behind the ratchet wheel 196 is a phase adjustment plate 200. The phase adjustment plate 200 is fixedly secured to the shaft 190 and defines a plurality of arcuate slots 202. Within each of the slots is disposed a threaded fastener 204 which seats within suitably threaded openings in the ratchet wheel 196. The arcuate slots 202 preferably define a length of arc at least equal to the length of arc between an adjacent pair of the ratchet teeth 198. The rotational position of the shaft 190 relative to the ratchet plate 196 may thus be adjusted by loosening the threaded fasteners 204, rotating the ratchet plate 196 relative to the phase adjustment plate 200 and retightening the threaded fasteners 204.

The shaft 190 is supported in a suitable bearing 206 which is secured to a mounting plate 208 which is in turn supported by the frame structure 62. Initial activation of the double acting pneumatic cylinder 170 moves the piston rod 172 and ratchet arm 174 counterclockwise about the shaft 190 as viewed in FIG. 6. Activation of the pneumatic cylinder 170 in a reverse manner drives the piston rod 172 and ratchet arm 174 clockwise and returns it to the position illustrated in FIG. 6. During this clockwise travel, the pawl 192 engages one of the ratchet teeth 198 on the ratchet wheel 196 and rotates the shaft 190 accordingly.

Referring now to FIGS. 4 and 5, the shaft 190 has secured to it a chain drive sprocket 220 and a chain 222 disposed thereabout. An idler sprocket 224 maintains proper tension of the chain 222. The chain 222 is also disposed about a chain sprocket 226 secured to a shaft 228. The shaft 228 functions as a common drive to the various conveyor chains of the tubing loader 10 and thus has a second sprocket 230 secured thereto which transfers rotary energy through a chain 232 upward to a sprocket 234 which is secured upon a shaft 236. The shaft 236 is suitably mounted for rotation and includes a second chain sprocket 238 which drives the chain 240. The chain 240 transmits power to a sprocket 242 (shown in FIG. 4) which is secured upon the shaft 116 of the right angle drive assembly 114. The chain 240 thus provides power to the horizontal or cross-conveyor assembly 16. A third sprocket 250 is also secured to the shaft 228. The third sprocket 250 engages the inner conveyor chain 68 and provides drive energy thereto. A fourth sprocket 252 is also secured for rotation with the shaft 228. A chain 254 is disposed about the sprocket 252 as well as a sprocket 256 secured to a shaft 258. Secured also to the shaft 258 is a sprocket 260 which drives the outer conveyor chain 66 in a manner similar to the drive to the inner conveyor chain 68. The diameters of the sprockets 250, 252, 256 and 260 are significant in that their size dictates the relative speed at which the outer chain conveyor 66 and inner chain conveyor 68 will circulate. It should be apparent from inspection of FIG. 4 that the outer conveyor chain 66 must circulate at a faster speed than the inner conveyor chain 68 in order to maintain the stock such as the glass tubes 24 in a radial array as they traverse the erection conveyor assembly 14. A speed or drive ratio of 7 to 4 between the outer conveyor chain 66 and inner conveyor chain 68 has been found suitable and thus appropriate selection of the diameters of the sprockets 250, 252, 256 and 260 should be made to achieve this speed or drive ratio. Proper tensioning of the outer and inner chain conveyor 66 and 68, respectively, may be achieved by utilization of a pair of resilient rollers 264 which are preferably fabricated of an elastomer such as rubber. The rollers 264 are disposed in compressed engagement with a respective one of the chains 66 and 68 upon suitable mounting shafts 266.

Operation of the tubing loader 10 is straight-forward and is best understood by referring to FIGS. 2 and 8. A plurality of glass tubes 24 are placed upon the stock receiving bars 48 of the stock feed table assembly 12 in generally the orientation illustrated in FIG. 2. Sensing switches located in the storage area 140 sense empty spaces, the double-acting pneumatic cylinder 170 cycles and indexes both the reorienting or erection conveyor assembly 14 and the horizontal or cross-conveyor assembly 16 one cycle. This indexing cycle causes one oscillation of the shaft 34 and rollers 38 disposed thereupon to assist segregation and juxtaposition of the glass tubes 24 into a single-file horizontal row abutting the stop plates 52. Each of the conveyor chains 66, 68 and 102 index one position and one length of stock, such as a glass tube 24, is removed from the stock feed table assembly 12 by the erection conveyor assembly 14. Likewise, one length of glass tube 24 is transferred from the upper end of the erection conveyor assembly 14 to the cross-conveyor assembly 16. It should be apparent that receipt and transfer of the glass tubing 24 from assembly to assembly of the tubing loader 10 is accomplished simultaneously inasmuch as the foregoing assemblies are driven commonly by the cyclic drive assembly 20. It should be noted, however, that with regard to the tubing transfer assembly 18, optimum performance is achieved by its cyclic operation at the completion of the cyclic operation of the other assemblies of the tubing loader 10. Therefore, the tubing transfer assembly 18 is cycled at the completion of the operating cycle of the drive assembly 20.

As noted previously, an appropriate drive ratio or pitch, i.e., the increment of travel of the outer chain 66 and the inner chain 68 has been found to be 7 to 4. Reference to FIG. 4 clarifies this relationship. Since a typical glass tube 24 is approximately 5 feet in length, and since common material handling practice suggests engaging such stock at two locations spaced from its ends, the relative engagement locations illustrated conform with such practice. The chains 66 and 68 therefore must move in the ratio of 7 to 4 to maintain the glass tubes 24 in an optimum radial array as illustrated.

Finally, with regard to the machine loading equipment 142, such a device may be a Coquelet feeder which is well known in the art and is a conventional device for loading glass tubes 24 into a vial machine 22.

The foregoing disclosure is the best mode devised by the inventors for practicing this invention. It is apparent, however, that devices incorporating modifications and variations to the instant invention will be obvious to one skilled in the art of stock transfer. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

What is claimed is:

1. An apparatus for receiving and reorienting elongate stock comprising, in combination,
    means for receiving a plurality of pieces of elongate stock in a substantially horizontal orientation;
    means associated with said receiving means for disposing such elongate stock substantially adjacent one another in a single thickness horizontal row; and
    means for reorienting such stock from such substantially horizontal orientation to a substantially vertical orientation, said reorienting means including a pluarality of stock engaging lugs secured to at least a pair of means for driving said lugs through an arc whereby each elongate stock is engaged by at least a pair of said lugs and is reoriented generally about one end.

2. The apparatus of claim 1 further including means for horizontally translating such elongate stock in such vertical orientation.

3. The apparatus of claim 1 wherein said disposing means includes at least two moveable wheels spaced above said receiving means at a distance substantially equal to the diameter of such elongate stock.

4. The apparatus of claim 1 wherein said means for driving said plurality of lugs includes at least a pair of chain conveyors.

5. The apparatus of claim 1 further including means for driving said reorienting means.

6. The apparatus of claim 1 further including means for springingly retaining such elongate stock in said reorienting means.

7. An apparatus for receiving, reorienting and transferring elongate stock comprising, in combination,
   means for receiving a plurality of pieces of elongate stock in a substantially horizontal orientation;
   means for juxtaposing said pieces of elongate stock in a single-file substantially horizontal row;
   means for reorienting such stock from such substantially horizontal orientation to a substantially vertical orientation, said reorienting means including a plurality of stock engaging lugs secured to at least a pair of means for driving said lugs through an arc whereby each elongate stock is engaged by at least a pair of said lugs and is reoriented generally about one end;
   means for horizontally transferring such elongate stock; and
   means for driving said reorienting means and said transferring means.

8. The apparatus of claim 7 wherein said juxtaposing means includes at least two moveable wheels operably coupled to said drive means and spaced from said receiving means at a distance substantially equal to the diameter of such elongate stock.

9. The apparatus of claim 7 wherein said pair of means for driving said lugs includes chain conveyors having said plurality of stock engaging lugs secured thereto.

10. The apparatus of claim 7 further including spring means for retaining such elongate stock in said reorienting means and guide means for retaining such elongate stock in said transferring means.

11. An apparatus for receiving, reorienting and transferring elongate stock comprising, in combination, an inclined stock receiving structure having a lower end and a substantially normally disposed stop structure adjacent said lower end, at least two wheels spaced from said stock receiving structure at a distance substantially equal to the diameter of such elongate stock, at least two conveyor chains disposed for movement about a quadrant of a circle, each of said chains having a plurality of stock engaging lugs secured thereto, at least two substantially vertically aligned conveyor chains disposed for movement about a horizontal path, each of said chains having a plurality of stock engaging lugs secured thereto, and drive means operably coupled to said conveyor chains for imparting motion thereto.

12. The apparatus of claim 11 further including means generally adjacent said conveyor chains disposed for movement about a quadrant of a circle for retaining such elongate stock in said stock engaging lugs as said such stock is reoriented.

13. The apparatus of claim 11 wherein said drive means includes a cyclically operated pneumatic cylinder operably coupled to a ratchet and pawl assembly.

14. The apparatus of claim 11 further including a storage area disposed adjacent said horizontal path and means for transferring such elongate stock from said vertically aligned conveyor chains to said storage area.

15. A method of providing elongate stock to fabricating equipment, the method comprising the steps of:
   A. supplying elongate stock into a substantially horizontal support structure in a non-precise manner,
   B. unscrambling the stock,
   C. driving a plurality of stock engaging lugs through an arc,
   D. engaging each stock with at least a pair of said plurality of stock engaging lugs, thereby reorienting each stock generally about one end while secured by the lugs to an oriented vertical position, and
   E. moving the stock in said oriented vertical position for subsequent feeding.

16. A method of automatically loading glass tubes from a horizontal scrambled position to a vial making machine, the method comprising the steps of:
   A. supplying glass tubes in a substantially horizontal position in a scrambled manner,
   B. unscrambling the glass tubes,
   C. driving a plurality of tube engaging lugs through an arc,
   D. engaging each tube with at least a pair of said plurality of tube engaging lugs, thereby reorienting each tube generally about one end while secured by the lugs to an oriented vertical position, and
   E. moving the glass tubes in said oriented vertical position for subsequent feeding into the vial making machine.

17. A method of providing 360° access for an operator to a vertical vial machine, the method comprising automatically loading the machine with lengths of glass tubes, the method comprising the steps of:
   A. providing lengths of glass tubes in a non-precise manner to a horizontal support,
   B. unscrambling the glass tubes and rearranging the tubes in a single row,
   C. driving tube engaging lugs through an arc,
   D. engaging each tube with the tube engaging lugs,
   E. reorienting each tube generally about one end while secured by the lugs, by moving the tubes one at a time with each tube engaged by a pair of lugs from horizontal orientation in a radial manner up to a vertical orientation above the machine at a height suitable for feeding the machine automatically and providing operator access to the machine,
   F. moving the tubes in said vertical orientation to the feeder of the machine; and
   G. pushing the tubes to the feeder in said vertical orientation and maintaining pressure on each tube to deliver the same to the machine feeder.

18. A method as defined in claim 17 in which the tubes are moved intermittently in steps E, F and G.

19. A method of providing elongate stock to fabricating equipment comprising the steps of:
   A. supplying elongate stock to a substantially horizontal support structure in a non-precise manner,
   B. rearranging the stock in a single horizontal row,
   C. driving stock engaging lugs through an arc,
   D. individually engaging such stock on a conveyor with at least a pair of lugs, thereby reorienting each stock about one end to an oriented vertical position, and
   E. moving stock in said oriented vertical position for subsequent feeding.

20. The method of claim 19 further including the step of providing such stock in such vertical orientation to a holding area for supply to such fabricating equipment.

21. The method of claim 19 wherein such conveyor functions intermittently.

22. The method of claim 19 further including the steps of translating such stock horizontally while such stock is in such vertical orientation and feeding the stock one at a time in vertical orientation to an overhead feeder for a vertical vial machine.

* * * * *